United States Patent
Ecklund et al.

(10) Patent No.: US 8,838,055 B2
(45) Date of Patent: Sep. 16, 2014

(54) DYNAMIC SUB-SAMPLING RADIO FREQUENCY MIXER SYSTEMS AND METHODS

(71) Applicant: Motorola Solutions, Inc., Schaumburg, IL (US)

(72) Inventors: Lawrence M. Ecklund, Wheaton, IL (US); Gregory J. Buchwald, Crystal Lake, IL (US); Stephen L. Kuffner, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/690,710

(22) Filed: Nov. 30, 2012

(65) Prior Publication Data

US 2014/0155011 A1 Jun. 5, 2014

(51) Int. Cl.
 *H04B 1/06* (2006.01)
 *H04B 7/00* (2006.01)
 *H04B 1/16* (2006.01)

(52) U.S. Cl.
 CPC ........................................ *H04B 1/16* (2013.01)
 USPC ............ 455/230; 455/323; 455/334; 375/345

(58) Field of Classification Search
 CPC ..... H03G 3/3052; H03G 3/3068; H04B 1/30; H03D 3/008
 USPC .............. 455/313, 323, 324, 334, 230, 232.1, 455/234.1, 240.1; 375/316, 345
 See application file for complete search history.

(56) References Cited

U.S. PATENT DOCUMENTS

| | | | |
|---|---|---|---|
| 6,230,000 B1 | 5/2001 | Tayloe | |
| 7,523,020 B2 | 4/2009 | Tice | |
| 7,539,476 B2 | 5/2009 | Devries et al. | |
| 7,656,970 B1 * | 2/2010 | Sankabathula et al. | 375/316 |
| 8,014,879 B2 | 9/2011 | Latham et al. | |
| 8,225,161 B2 | 7/2012 | Chernyshev et al. | |
| 2002/0098823 A1 | 7/2002 | Lindfors et al. | |
| 2002/0193090 A1 | 12/2002 | Sugar et al. | |
| 2006/0141969 A1 | 6/2006 | Dubash et al. | |
| 2011/0096875 A1 | 4/2011 | Amrutur et al. | |
| 2013/0016619 A1 | 1/2013 | Rahman et al. | |

FOREIGN PATENT DOCUMENTS

| | | | |
|---|---|---|---|
| EP | 1176708 A2 | 1/2002 | |
| EP | 1259965 B1 | 10/2010 | |

* cited by examiner

*Primary Examiner* — Nhan Le
(74) *Attorney, Agent, or Firm* — Steven A. May; Kenneth A. Haas (57) ABSTRACT

A mixer, a receiver, and a method provide dynamic sub-sampling mixer which adjust a sub-sampling rate based on power drain and performance. A mixer includes mixer circuitry receiving an input of a Radio Frequency (RF) input signal and providing an output of a baseband signal of the RF input sampled at a sub-sampling rate, baseband parametric control circuitry receiving the baseband signal and measuring at least one parametric value of the baseband signal, and sampling period control circuitry receiving the at least one parametric value and adjusting the sub-sampling rate based thereon, the sub-sampling rate or ratio is adjusted minimize power drain while ensuring performance of the at least one parametric value is satisfying a predetermined level.

14 Claims, 11 Drawing Sheets

DYNAMIC SUB-SAMPLING RADIO FREQUENCY MIXER SYSTEMS AND METHODS

FIELD OF THE DISCLOSURE

The present disclosure relates generally to radio frequency (RF) receivers and more particularly to dynamic sub-sampling mixer systems and methods which adjust a sub-sampling rate based on power drain and performance.

BACKGROUND

Generally, direct conversion receivers receive radio signals and down convert received radio signals to baseband where information from the received radio signals may be obtained. Such direct conversion receivers can include high performance mixers. An exemplary high performance mixer is disclosed in U.S. Pat. No. 6,230,000 to D. Tayloe issued May 8, 2001 and entitled "PRODUCT DETECTOR AND METHOD THEREFOR," the contents of which are incorporated by reference herein. High performance mixers can be realized in electrical circuitry such as Complementary metal-oxide-semiconductor (CMOS) and disadvantageously can have high capacitance which draws a high current (and thus high power) on each switch cycle of the mixer. Conventionally, such direct conversion receivers and high performance mixers are used in mobile and portable devices. Power drain is critical to such mobile and portable devices which utilize batteries for power. Accordingly, to support extended battery life, there is a need for dynamic sub-sampling mixer systems and methods which adjust a sub-sampling rate based on power drain and performance. That is, there is a need for dynamic sub-sampling mixer systems and methods which vary the sub-sampling ratio based on a required noise figure, which can also be defined as low signal level performance, of the associated receiver.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, dynamic sub-sampling (i.e., under-sampling) mixer systems and methods are described which adjust a sub-sampling rate based on power drain and performance. The mixer systems and methods can detect baseband performance and adjust a sub-sampling rate for a lowest power drain while not degrading the performance beyond a required level. Here we define sub-sampling rate as an absolute value (e.g., 333 MHz is a sub-sampling rate of a nominal 1 GHz sampling rate) while sub-sampling ratio is a relative value (e.g. 3X, for 1 GHz/3X=333 MHz). The mixer systems and methods address concerns related to power consumption of high dynamic range mixers. As described herein, these mixers have large CMOS devices and drive circuitry, which result in a large capacitance that is charged and discharged on every switching cycle further resulting in significant power dissipation in the mixer devices and drivers.

Since the mixer is using a sampling format, the mixer gain is relatively constant with changes in sub-sampling ratio. The third-order input intercept point (IIP3) performance degrades slightly with increasing sub-sampling ratio. The noise figure (NF) performance also degrades as the sub-sampling ratio is increased as is described herein. However, it is often the case that it is desirable to trade-off noise figure for a lower overall current drain in a receiver. Thus the sub-sampling rate could dynamically adapt based on the received signal strength where a worse NF is tolerable. However, this adaptive mode wouldn't necessarily be the only or best operational mode. For example, assume that the receiver is simply being awakened on a periodic schedule to determine if another transceiver is signaling it. The carrier can easily be detected even with a poor noise figure and as long as there is no carrier present there is no reason to expend the power required using a high sub-sampling rate to decode the message, i.e. a mode-driven override of the dynamic adaptation where the mode could be dynamic adaptation, carrier detect, frequency band (e.g. High Frequency (HF) band with its typically high environmental noise), or even a battery charge status. Note that "carrier" may be utilized in the classic radio terminology sense or it could be referenced by a signal compatible with the transmission system in use such as Orthogonal frequency-division multiplexing (OFDM) where control channels, pilots, or other signals within the structure of the transmitted signal may be utilized to determine the presence of a desired signal. Another example is the situation where high environmental noise is present. In this situation the environmental noise may dominate the sub-sampling generated noise so that the power in the mixer could be reduced by lowering the sub-sample rate without any noticeable loss in noise performance.

In an exemplary embodiment, a mixer system includes mixer circuitry receiving an input of a Radio Frequency (RF) input signal and providing an output of a signal of the RF input sampled at a sub-sampling rate; baseband parametric control circuitry receiving the signal and measuring at least one parametric value of the signal and determining a mode of operation; and sampling period control circuitry receiving the at least one parametric value and the mode of operation and adjusting the sub-sampling rate based thereon, wherein the sub-sampling ratio is adjusted to minimize power drain while ensuring performance of the at least one parametric value is satisfying a predetermined level. The at least one parametric value can include one of carrier-to-noise ratio (CNR), bit error rate (BER), and signal-to-noise ratio (SNR), and wherein the sampling period control circuitry can be configured to determine a greatest sub-sampling ratio based on the at least one parametric value. The automatic adaptation override mode of operation can be comprised of carrier detect, frequency band, and battery charge status and others.

The sampling period control circuitry can be configured to: initiate at a 1X sub-sampling rate; and perform a feedback loop including the steps of: receiving a measurement of the at least one parametric value; if the at least one parametric value satisfies a predetermined level and if the sub-sampling rate is not at a minimum rate, reducing the sub-sampling rate for increased sub-sampling ratio; and if the at least one parametric value does not satisfy the predetermined level and if the sub-sampling rate is not at a maximum rate, increasing the sub-sampling rate for decreased sub-sampling ratio. Optionally, the sampling period control circuitry can be configured to: perform the feedback loop including the steps of: receiving the measurement of the at least one parametric value and determining the mode of operation; if the at least one parametric value satisfies the predetermined mode, if the sub-sampling rate is not at the minimum rate, and based on the mode of operation, reducing the sub-sampling rate for increased sub-sampling ratio; and if the at least one parametric value does not satisfy the predetermined mode, if the sub-sampling rate is not at the maximum rate, and based on the mode of operation, increasing the sub-sampling rate for decreased sub-sampling ratio.

Alternatively, the sampling period control circuitry can be configured to: perform the feedback loop including the steps of: receiving a measurement of at least two parametric values, the weighting of which are interactively determined to perform a soft decision based thereon; if the combination of the at least two parametric values satisfy predetermined levels and if the sub-sampling rate is not at a minimum rate, reducing the sub-sampling rate for increased sub-sampling ratio; and if the combination of the at least two parametric values do not satisfy the predetermined levels and if the sub-sampling rate is not at a maximum rate, increasing the sub-sampling rate for decreased sub-sampling ratio. The mixer circuitry and the sampling period control circuitry can include: an input port; a first pulse generator coupled to a first switch and a second switch; a second pulse generator coupled to a third switch and a fourth switch, wherein the first pulse generator and the second pulse generator operate at the sub-sampling rate; and a first capacitor and a second capacitor coupled to the first switch, the second switch, the third switch, and the fourth switch and configured to hold energy from the input port based on the first switch, the second switch, the third switch, and the fourth switch.

The first switch, the second switch, the third switch, and the fourth switch can operate in an in-phase mixer, and wherein the mixer circuitry and the sampling period control circuitry further include a quadrature mixer including: a third pulse generator coupled to a fifth switch and a sixth switch; a fourth pulse generator coupled to a seventh switch and a eighth switch, wherein the third pulse generator and the fourth pulse generator operate at the sub-sampling rate; a third capacitor and a fourth capacitor coupled to the fifth switch, the sixth switch, the seventh switch, and the eighth switch and configured to hold energy from the input port based on the fifth switch, the sixth switch, the seventh switch, and the eighth switch. The fifth switch, the sixth switch, the seventh switch, and the eighth switch cam include complementary metal-oxide-semiconductor switches.

In another exemplary embodiment, a direct conversion receiver includes a wired connection to a conducted, distributed Radio Frequency (RF) system; in-phase mixer circuitry receiving a filtered input from an RF device and providing an output of a baseband signal of the RF input sampled at a sub-sampling rate; quadrature mixer circuitry receiving a filtered input from the RF device and providing an output of a baseband signal of the RF input sampled at a sub-sampling rate; baseband parametric control circuitry receiving the baseband signal and measuring at least one parametric value of the baseband signal; and sampling period control circuitry receiving the at least one parametric value and determining a mode of operation and adjusting the sub-sampling rate based thereon, wherein the sub-sampling rate is adjusted to minimize power drain while ensuring performance of the at least one parametric value is satisfying a predetermined level.

In yet another exemplary embodiment, a method includes operating a Radio Frequency (RF) mixer at a sub-sampling rate, wherein the sub-sampling rate is initially set at 1X; and perform a feedback loop to adjust the sub-sampling rate including the steps of: receiving a measurement of the at least one parametric value; if the at least one parametric value satisfies a predetermined level and if the sub-sampling rate is not at a minimum rate, reducing the sub-sampling rate for increased sub-sampling ratio; and if the at least one parametric value does not satisfy the predetermined level and if the sub-sampling rate is not at a maximum rate, increasing the sub-sampling rate for decreased sub-sampling ratio.

Figure 1:
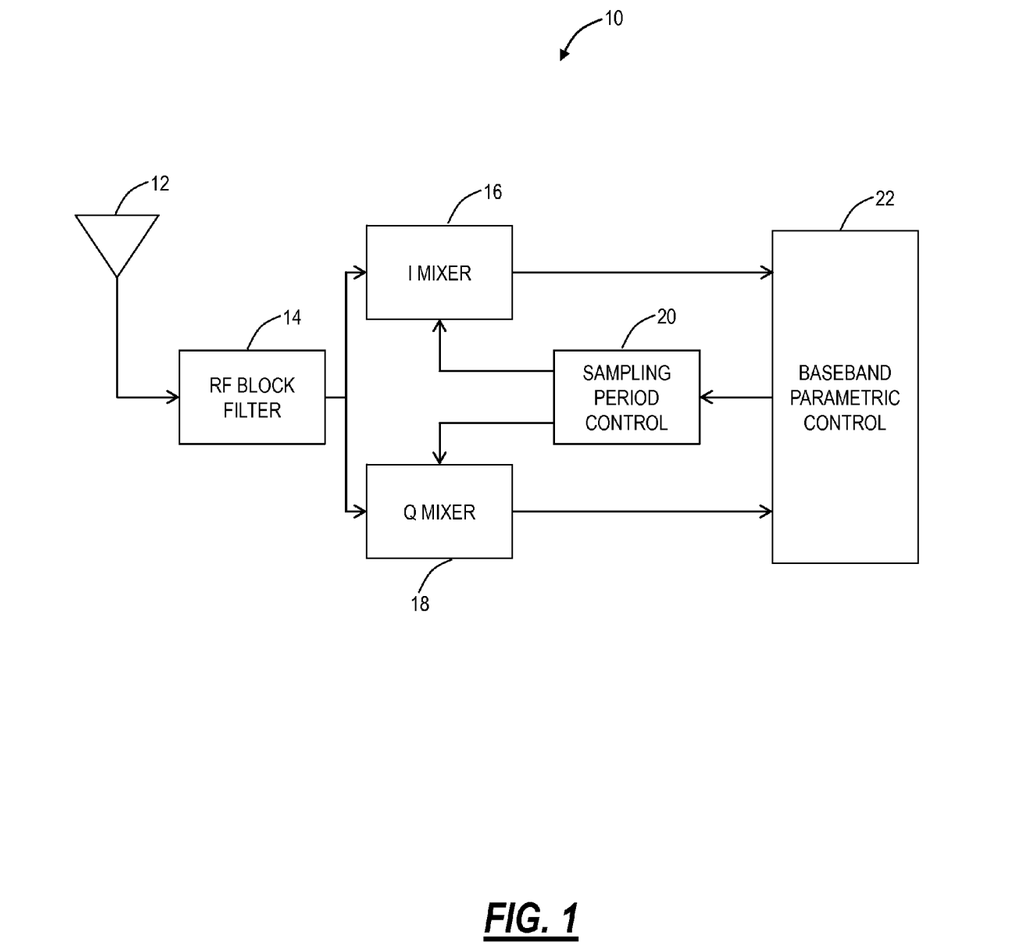
FIG. 1 is a block diagram of a receiver for dynamic sub-sampling mixer systems and methods in accordance with some embodiments.
Figure 7:
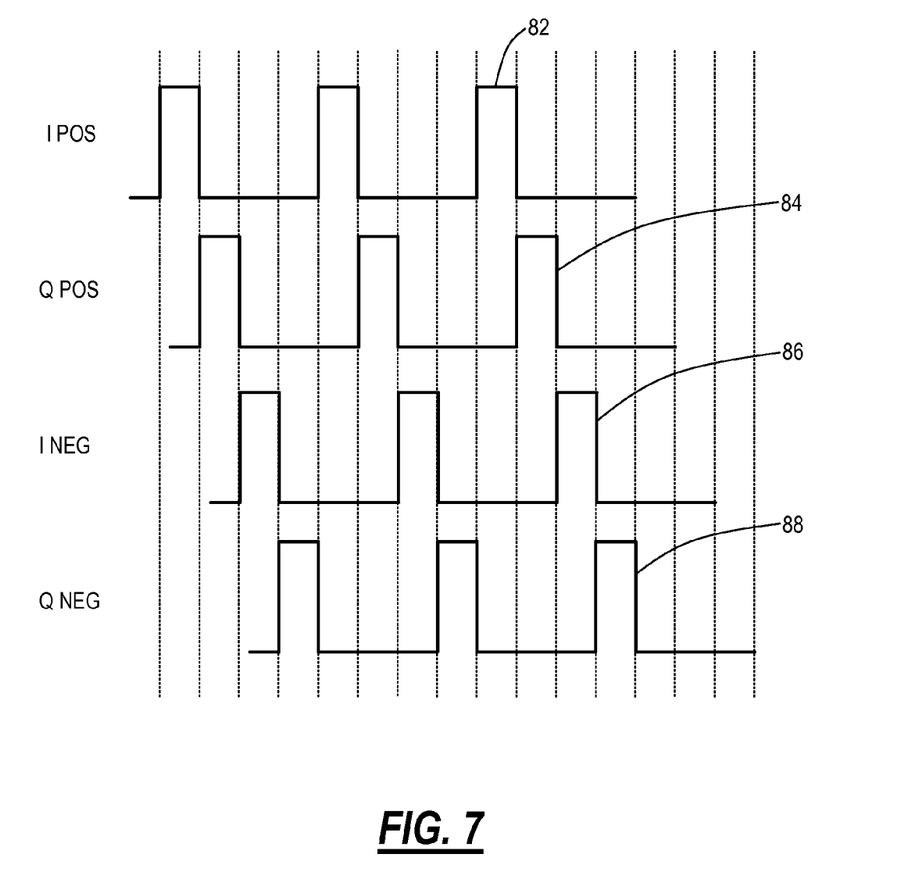
FIG. 7 is a graph of local oscillator (LO) drive to the mixer of FIG. 6 and/or FIG. 3 in a 1X sampling configuration in accordance with some embodiments.

Referring to FIG. 1, in an exemplary embodiment, a block diagram is provided that illustrates a receiver 10 that implements dynamic sub-sampling mixer systems and methods. The receiver 10 includes an antenna 12, an RF block filter 14, an in-phase (I) mixer 16, a quadrature (Q) mixer 18, sampling period control circuitry 20, and baseband parametric control circuitry 22. The antenna 12 is configured to receive an RF signal and to provide the RF signal to the RF block filter 14 for filtering thereof. The RF filter 14 provides the filtered RF signal to the mixers 16, 18. Each I and Q mixer 16, 18 is supplied with two phase shifted replicas of a sampling trigger, i.e., an output of a sampling period control circuitry 20, for example, as shown in FIG. 7. Each mixer 16, 18 samples the output when the pulse is high and holds the result when it is low in FIG. 7. Assuming the sampling trigger is for the I mixer 16, a replica of it is delayed by 90 degrees (i.e., one-quarter of the I POS period) and then supplied to the Q mixer 18 as shown in FIG. 7. Another replica is delayed by 180 degrees and supplied to an inverting portion of the I mixer 16. A third replica is delayed by 270 degrees and supplied to an inverting sampling input of the Q mixer 18.

Figure 5:
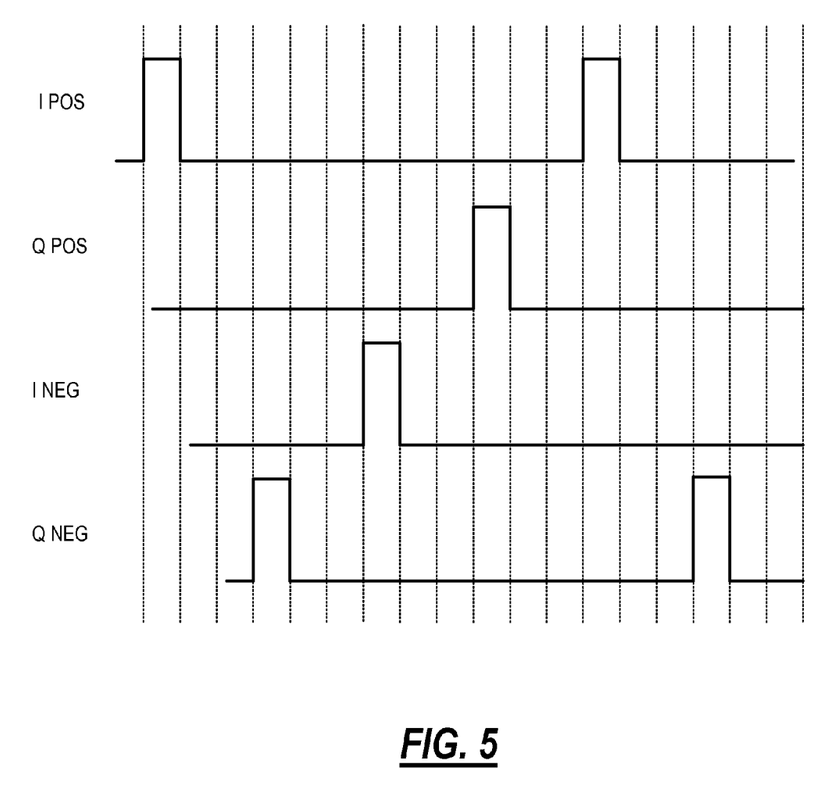
FIG. 5 is a graph of waveforms sub-sampling at 3X for the mixer of FIG. 3 and/or FIG. 6 in accordance with some embodiments.

To sub-sample the mixers 16, 18 requires removing sampling pulses in a repetitive manner as in going from FIG. 7 to FIG. 5. As described herein, sub-sampling may also be referred to as under-sampling. For example, sub-sampling may include removing every second and third pulse in FIG. 7 in all mixer sampling inputs. Therefore each mixer 16, 18 would hold the output three times as long before it is refreshed. It would therefore be sub-sampling by a factor of three. If, additionally, the fourth and fifth pulses were removed, the sub-sampling would go to five and so on. Note this functionality can be implemented in a plurality of circuit implementations. In an exemplary embodiment, the mixers 16, 18 can be based on a Tayloe approach as described in U.S. Pat. No. 6,230,000.

The receiver 10 implements a feedback loop wherein the baseband parametric control circuitry 22 is configured to measure parametric values such as carrier-to-noise ratio (CNR), bit error rate (BER), signal-to-noise ratio (SNR), etc. The baseband parametric control circuitry 22 can also determine a mode of operation. These parametric values are provided to the sampling period control circuitry 20 which determines a greatest amount of sub-sampling based on the parametric values and correspondingly may adjust a sampling rate employed by the mixers 16 and 18. For example, the parametric values can include predetermined threshold values of minimum performance. If the desired parametric values can be obtained in the sub-sampling mode, then the greatest amount of sub-sampling that will work will be used such that the parametric values are above the threshold values. If not, the mixers 16, 18 will run in a standard sampling mode. As described herein, in the sampling mixer 16, 18, each switching event uses power, therefore removing switching events saves power.

For example, the sampling period control circuitry 20 may compare the measured receive signal metric against a predetermined level to see if an adjustment is required to the sampling rate of the mixers. If the measured receive signal metric is above the predetermined level and if the sampling rate is not at a minimum rate, the sampling period control circuitry 20 may reduce a sampling rate clock or equivalently increase a sub-sampling ratio employed by the mixers. If the measured receive signal metric is below the predetermined level and if the sampling rate is not at a maximum rate, then the sampling period control circuitry 20 may increase the sampling rate clock or equivalently reduce the sub-sampling ratio employed by the mixers. Note that a sub-sampling rate is an absolute value whereas as a sub-sampling ratio is a relative value, and either term could be used herein.

Figure 2:
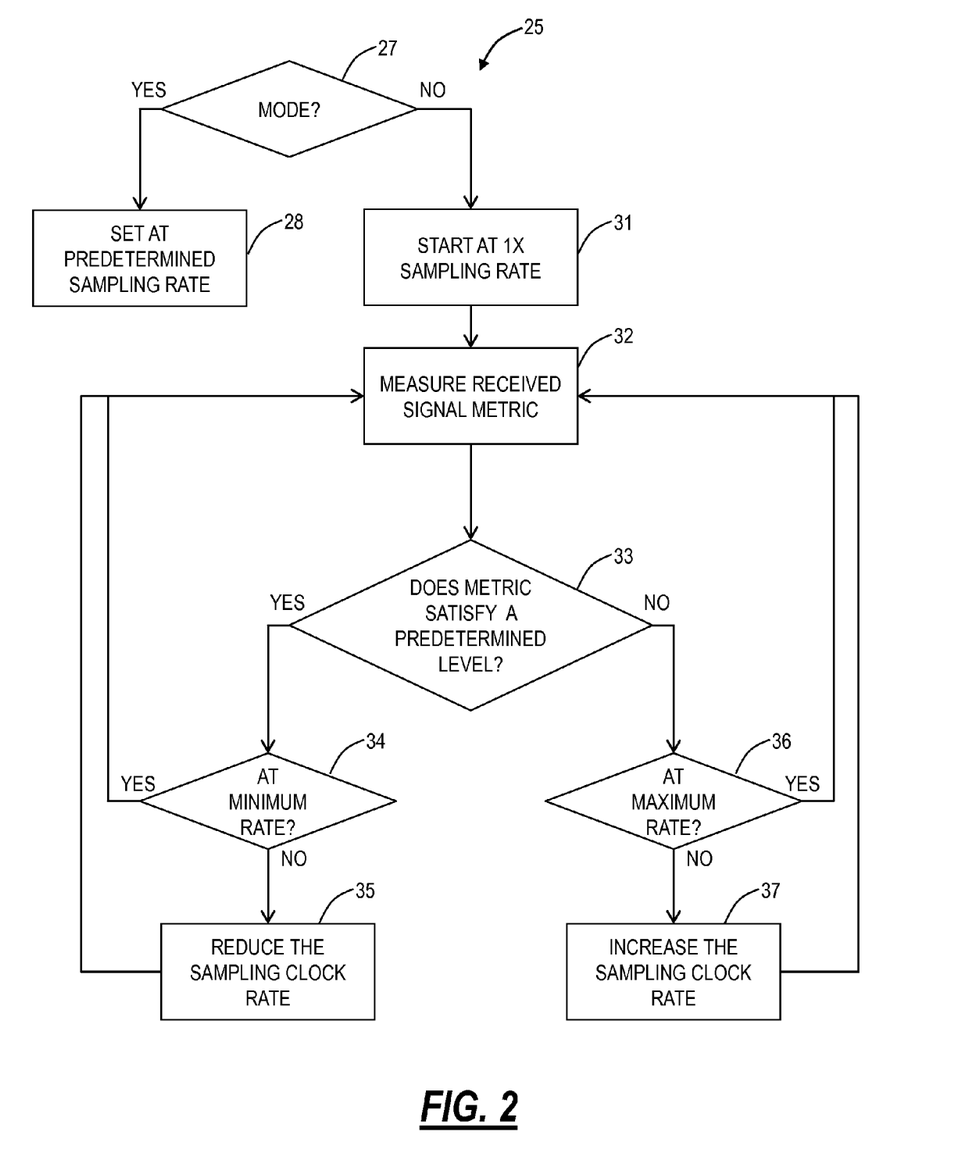
FIG. 2 is a flowchart of a dynamic sub-sampling mixer method in accordance with some embodiments.

Referring now to FIG. 2, in an exemplary embodiment, a flowchart is provided which illustrates a dynamic sub-sampling mixer method 25. The dynamic sub-sampling mixer method 25 can be implemented in the receiver 10 such as through the mixers 16, 18, and the control circuitry 20, 22. The dynamic sub-sampling mixer method 25 first determines if a mode of operation is set (step 27). If the mode of operation is set (step 27), then the dynamic sub-sampling mixer method 25 operates at a predetermined sampling rate based on the mode of operation (step 28). If the mode of operation is not set (step 27), the dynamic sub-sampling mixer method 25 starts at a normal sampling rate (step 31). That is, the dynamic sub-sampling mixer method 25 starts with a mixer sampling at a normal rate. The dynamic sub-sampling mixer method 25 measures a received signal metric (step 32). As described herein, this can include parametric values such as CNR, BER, SNR, DC power, etc. or a combination thereof. In an exemplary embodiment, a dynamic adaptation decision making process with the parametric values can include a soft combination of metrics such as, e.g., SNR and DC power.

As shown in step 27, the dynamic decision making process can also be overridden based on the mode of operation. In addition or instead of the parametric values, the dynamic sub-sampling mixer method 25 can be based on a mode of operation. For example, this operation can be a mode-driven override. In an exemplary embodiment, a mode could be any or more of a dynamic adaptation status, a carrier detect status, a frequency band status, a battery charge status, and the like. The dynamic sub-sampling mixer method 25 can use the mode and/or parametric values herein.

An objective of the dynamic sub-sampling mixer method 25 is to adjust the normal sampling rate while considering parametric performance (or mode of operation). That is, the dynamic sub-sampling mixer method 25 checks the measured receive signal metric against a predetermined level (step 33) to see if an adjustment is required to the sampling rate of the mixer. If the measured receive signal metric is above the predetermined level (step 33) and if the sub-sampling rate is not at a minimum rate (step 34), the dynamic sub-sampling mixer method 25 reduces the sub-sampling rate clock or equivalently increases the sub-sampling ratio (step 35). If the measured receive signal metric is below the predetermined level (step 33) and if the sub-sampling rate is not at a maximum rate (step 36), then the dynamic sub-sampling mixer method 25 increases the sub-sampling rate clock or equivalently reduces the sub-sampling ratio (step 37). Note, a sub-sampling rate is an absolute value whereas as a sub-sampling ratio is a relative value, and either term could be used herein.

Wireless transceivers are becoming more frequency agile to use multiple pieces of spectrum simultaneously. In this environment, the receiver design needs to be more robust with respect to internally generated intermodulation (IM) products. Receiver RF filtering needs to cover the total RF frequency band that is used. CMOS Sampling Mixers such as the Tayloe approach have been shown to have good Noise Figure and high IIP3. Therefore, the Tayloe approach of mixer design has application in wireless and wired receivers and transceivers among other applications.

Each mixer 16, 18, preferably a doubly-balanced Tayloe design, is driven by a pulse generator, or local oscillator (LO), that can generate the ¼ RF cycle LO pulses as required by the mixer. If the environment requires the best possible noise performance, the pulses on the individual LO phases and clock ports will be generated once an RF cycle. However, if this level of noise performance is not required then the pulses will be generated less often and only when it is necessary to maintain the spurious and noise performance. Since each mixer 16, 18 can comprise a CMOS switch, the power dissipated in the mixer/switch is a function of the number of transitions. Therefore the fewer the transitions, the lower the power drain. As described in the receiver 10 and the method 25, the decision process is performed by detecting a performance parameter such a BER, CNR, SNR or etc. and/or determining a mode of operation and adjusting the sub-sampling so that the desired performance is obtained. Of course the performance parameter could also be adjustable depending on the amount of mixer power required to obtain it.

Figure 3:
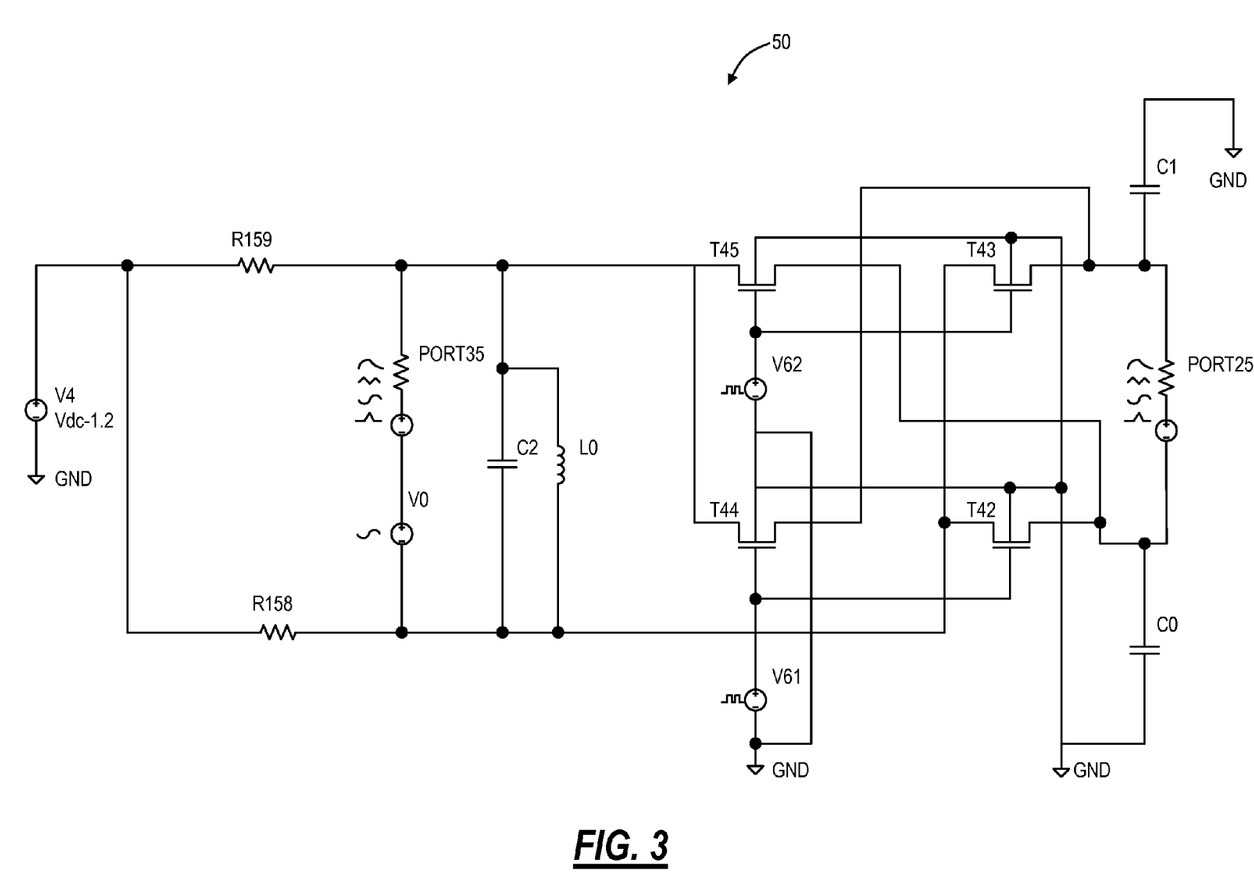
FIG. 3 is a circuit diagram of a topology of an exemplary doubly balanced I or Q mixer sub-sampling accordance with some embodiments.
Figure 9:
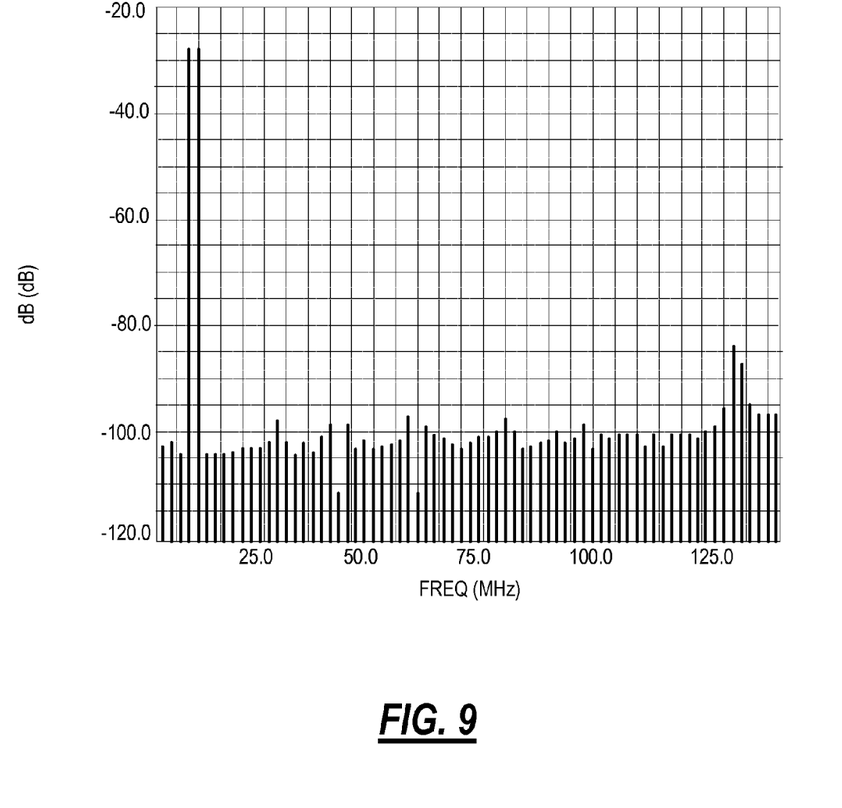
FIG. 9 is a graph of a frequency based output waveform of the mixer of FIG. 6 in a 3X sub-sampling configuration in accordance with some embodiments.
Figure 10:
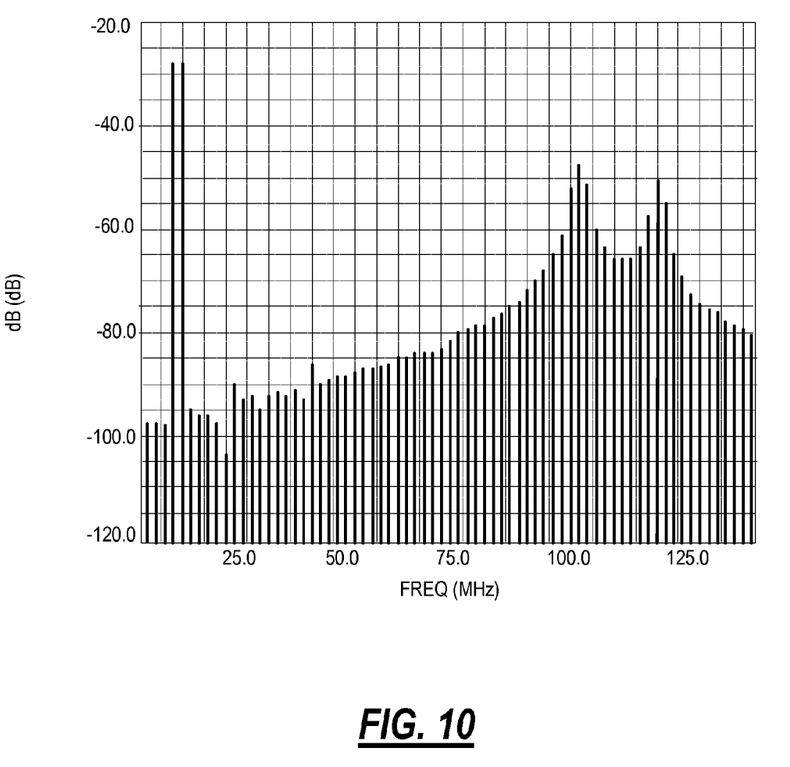
FIG. 10 is a graph of a frequency based output waveform of the mixer of FIG. 6 in a 9X sub-sampling configuration in accordance with some embodiments.

Referring now to FIG. 3, in an exemplary embodiment, a circuit diagram illustrates a topology of an exemplary mixer 50 utilizing the dynamic sub-sampling mixer systems and methods. An objective of the mixer 50 is to minimize the overall power necessary to drive an LO port of the mixer, thus maximizing battery life in portable devices and reducing power consumption in base station and mobile devices, in a high performance sampling mixer such as the Tayloe. In the topology of the mixer 50, an input RF signal is sampled at specific instances, "sampling intervals," and the output signal level at each "sampling interval" is stored on a capacitor. The amplitude of a voltage on the capacitor is essentially independent of the frequency of the sampling rate, assuming that there is negligible current drawn off of the capacitor when the capacitor is not undergoing sampling (i.e., holding). Therefore the demodulated signal amplitude for the following analysis is assumed to be constant for all of the sampling rates discussed. For example, as shown in FIGS. 9 and 10, the two down-converted carrier spikes stay at the same output level even at the two different sub-sampling ratios of 3X and 9X.

Referring still to FIG. 3, V61 and V62 are LO pulse generators that generate the pulses that activate CMOS switches T45, T44, T43, and T42 to produce the "sampling intervals". When the switch T45, T44, T43, and T42 is "on", the energy from Port 35 is applied to an appropriate capacitor C0, C1. Note that the switches turn on in pairs, that is, a first pair T45 and T43, and a second pair T44 and T42. Capacitors C1, C0 are charged during the "on time" of the pairs of switches T45/T43 and T44/T42, and correspondingly the "on time" of the LO pulse generators V61 and V62, and hold the value of the integrated energy at the end of the "on time". To facilitate this hold, the resistance of Port 25 is set at 1 M Ohm so that negligible current is leaked off of the node when the switches are turned off. For example, the pulse generators can be an implementation of the sampling period control circuitry. Note the sampling period control circuitry can include additional circuitry that receives the parametric values and makes decisions based thereon.

The greater the physical channel width of the CMOS switches T45, T44, T43, and T42, the lower the "on resistance" exhibited by the switches T45, T44, T43, and T42. Therefore not considering device parasitics, a larger (lower resistance) device will degrade the noise figure (NF) presented to it by an RF amplifier less than a smaller (higher resistance) device. This particularly presents a concern for receivers that use very high dynamic range RF and mixer stages where the gain and impedance of the RF amplifier is low. There are several drawbacks in using larger devices for the Tayloe mixer; discussed herein is power consumption of a driver stage of the mixer.

Assume that CMOS drivers of the LOs are a standard complimentary gain section and that the CMOS drivers need to supply an effective low impedance drive at the gates of the switches T45, T44, T43, and T42. Typically the CMOS drivers, that is, amplifier devices, need to be approximately the size of the mixer devices, i.e., CMOS switches T45, T44, T43, and T42. The dissipated power in the CMOS devices occurs each clock cycle and is the direct result of charging and discharging the capacitance on the gates of the sampling field-effect transistors (FETs)/switches and the "drain source" capacitance of the amplifier output devices utilized to drive the mixer switches. The peak current for large devices can be significant.

Note, the exemplary mixer 50 is shown in a simplified design for illustration purposes. For example, the CMOS switches T45, T44, T43, and T42 can be replaced by both Positive Channel Field Effect Transistors (PFETs) and Negative Channel Field Effect Transistor (NFETs) with twice the number of pulse generating drives.

Figure 4:
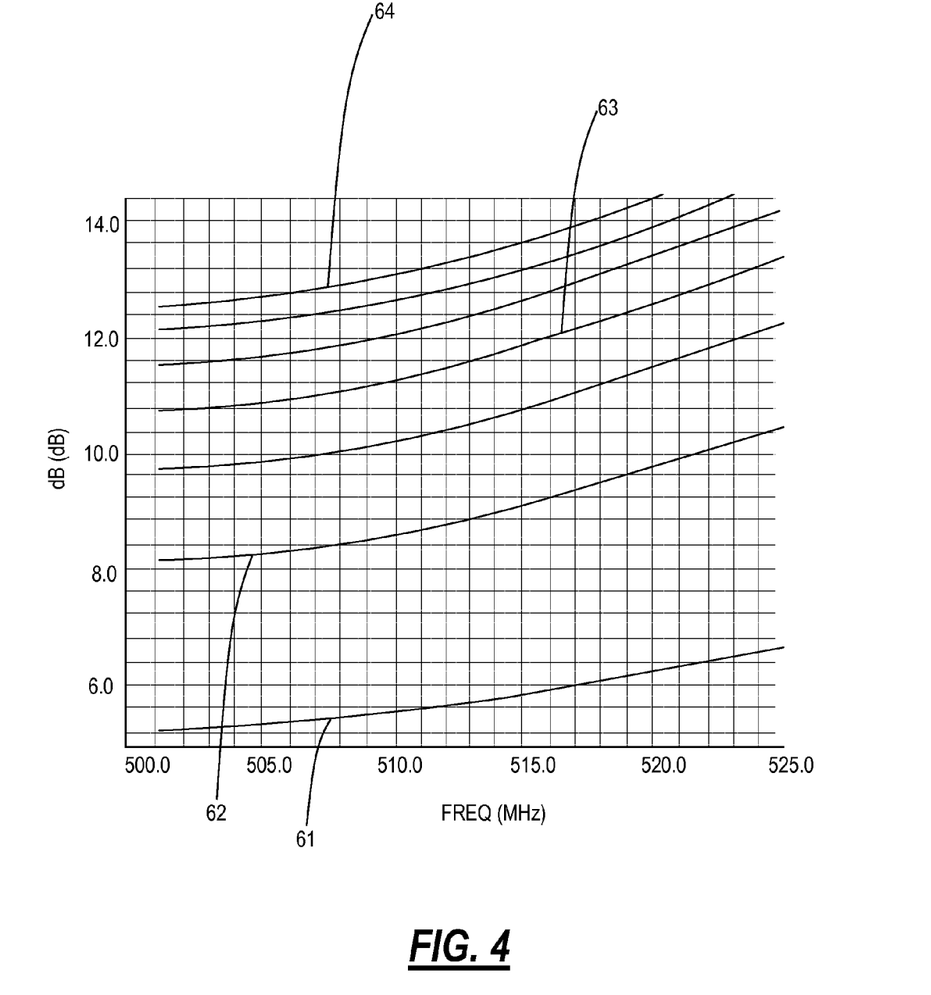
FIG. 4 is a graph of Noise Figure (NF) of various sub-sampling amounts for the mixer of FIG. 3 in accordance with some embodiments where the x-axis is the mixer input frequency.

Referring now to FIG. 4, a graphical illustration is provided of exemplary noise figures (NFs) of the dynamic sub-sampling systems and methods. Specifically, FIG. 4 is a graph of periodic noise figure response in dB versus RF input frequency for a 500 MHz LO. A trace 61 (NF of about 5.25 dB) is for an integration time of x and a hold time of x (i.e., a combined LO POS plus LO NEG duty cycle of 50%), beginning at each pulse of the LO signal. This is the standard balanced Tayloe mode. A trace 62 (NF of about 8.2 dB) is for the integration time being x and a hold time being 5x for a 3X sub-sampling ratio. A trace 63 (NF of about 10.8 dB) is for the integration time being x and a hold time being 13x for a 7X sub-sampling ratio. A trace 64 (NF of about 12.6 dB) is for an integration time of x and a hold time being 25x for a 13X sub-sampling ratio. There are two main concerns in using this approach. First, the NF gets worse with a higher order sub-sampling ratio. Secondly, there must be sufficient filtering before the mixer to minimize any RF interference that is far enough removed in frequency from the sampling frequency to alias into the baseband. This may or may not be a major concern depending on the RF filtering present in the receiver.

FIGS. 5 and 7 are graphs of exemplary LO drive sampling waveforms that may be applied to the switches of mixer 50 (or mixer 80, as described hereinbelow), that is, switches T45, T44, T43, and T42. In an exemplary embodiment of the 1X mode sampling at 500 MHz, the pulses (82, 84, 86, 88) could be 0.5 nanoseconds (ns) pulses in FIG. 7 to the I multiplier which occur once every ns but the pulse to each switch occurs once each two ns. The 3X sub-sampler version removes 2 pulses per sampling phase as shown in FIG. 5. The 3X sub-sampler version is accomplished by sampling at the same time slot as each LO drive did in the 1X version, only ⅓ as often. The baseband signal level held on the capacitors C0/C1 is approximately the same as for the circuit of FIG. 7, however it is only updated one-third as often. By reducing the frequency of the sampling, the power drain due to the switch drivers is proportionally reduced. Depending on the front-end gain, once the signal is a certain number of dB above a noise sensitivity level of the mixer, the mixer's sampling rate could be throttled down by some factor to reduce radio power drain. By linking the mixer's sampling rate with a received signal quality metric as described in the method 25, the sampling rate could be adapted to maintain a desired performance.

This method could dynamically adapt the sampling rate to compensate for propagation effects such as shadowing or fading, and could also adapt to sub-harmonically related interferers. For example, if there is sub-harmonic interference that could degrade the mixer's noise sensitivity (the level of which depends on the desired signal strength and the quality metric), then once the sampling rate was stepped down to where that interference became an issue in the received signal metric, the receiver controller could return to the next higher sampling rate until the metric was again above a predetermined level (dependent on the modulation and coding settings). If there is no sub-harmonic interference, that would be evident from the metric as well, and the rate could drop in steps until the received signal metric falls below the predetermined level for the communications mode due to the noise figure increase. Some amount of hysteresis around the predetermined level may be necessary to keep the system from chattering between two adjacent sampling rates. Different attack and decay times may also be applied to the dynamic adaptation, e.g., using a slow time constant in increasing the sub-sampling ratio when a favorable parametric value is detected (like high SNR) but using a fast time constant in decreasing the sub-sampling ratio when an unfavorable parametric value is detected (like low SNR or high BER).

Figure 6:
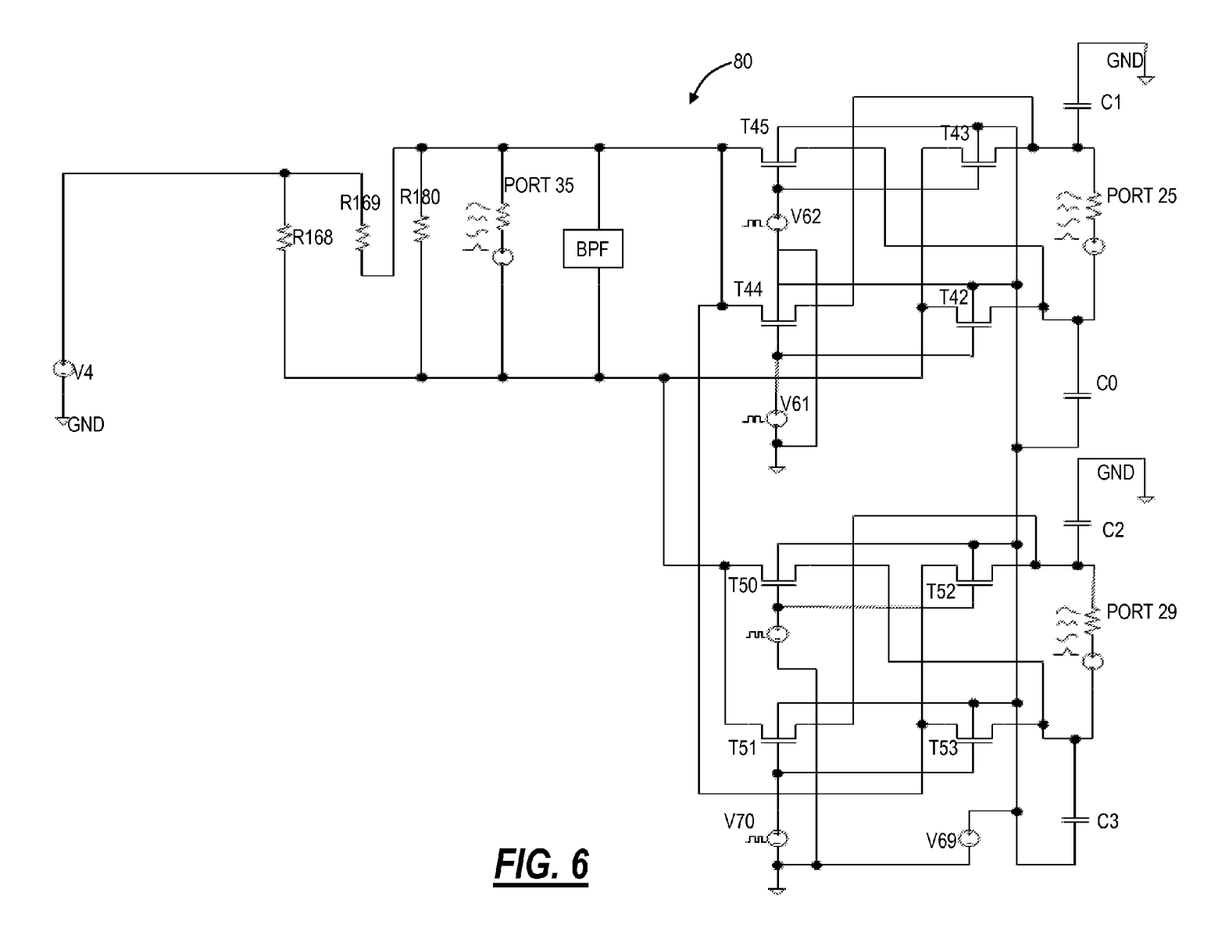
FIG. 6 is a circuit diagram of a topology of an exemplary doubly balanced I and Q mixer sub-sampling accordance with some embodiments.

Referring now to FIG. 6, in an exemplary embodiment, a circuit diagram is provided that illustrates a topology of another exemplary mixer 80 utilizing the dynamic sub-sampling mixer systems and methods. The mixer 80 is a balanced I and Q Tayloe based mixer. FIG. 7 depicts exemplary LO drives to the Tayloe Mixer 80, and more particularly to the switches of the mixer 80. Traces 82, 84, 86, 88 are each an output of one of the LOs, or pulse generators, V16, V62, V69, V70 in the mixer 80. In this exemplary embodiment, the mixer 80 is operating at 500 MHz. Each 500 picosecond (ps) wide pulse as described above for FIG. 5 operates as a gate drive to cause a switch pair, such as switch pair T45 and T43 or switch pair T44 and T42, to turn on, or conduct, thereby placing a sampled positive and negative input voltage on each output capacitor C0/C1 once every 500 MHz sample period. For reference, assume the trace 82 is for the positive I sampler, the trace 84 is the positive Q sampler, the trace 86 is the negative I sampler and the trace 88 is the negative Q sampler.

Therefore, the trace 82 (from the LO V62) turns on positive I switches T45, T43 for a quarter of a cycle charging capacitors C1 and C0 to the positive and negative input voltage respectively. These sampled input voltages are held on the capacitors for the next quarter cycle. Then the trace 86 turns on switches T44, T42, for a quarter of a cycle updating each capacitor's C0/C1 voltage. The same sequence happens in the other mixer, comprising switch pairs T52/T50 and T53/T51 and capacitors C2 and C3, using the traces 84, 88. Therefore all four capacitors C0, C1, C2, and C3 are updated twice for each 500 MHz cycle.

Figure 8:
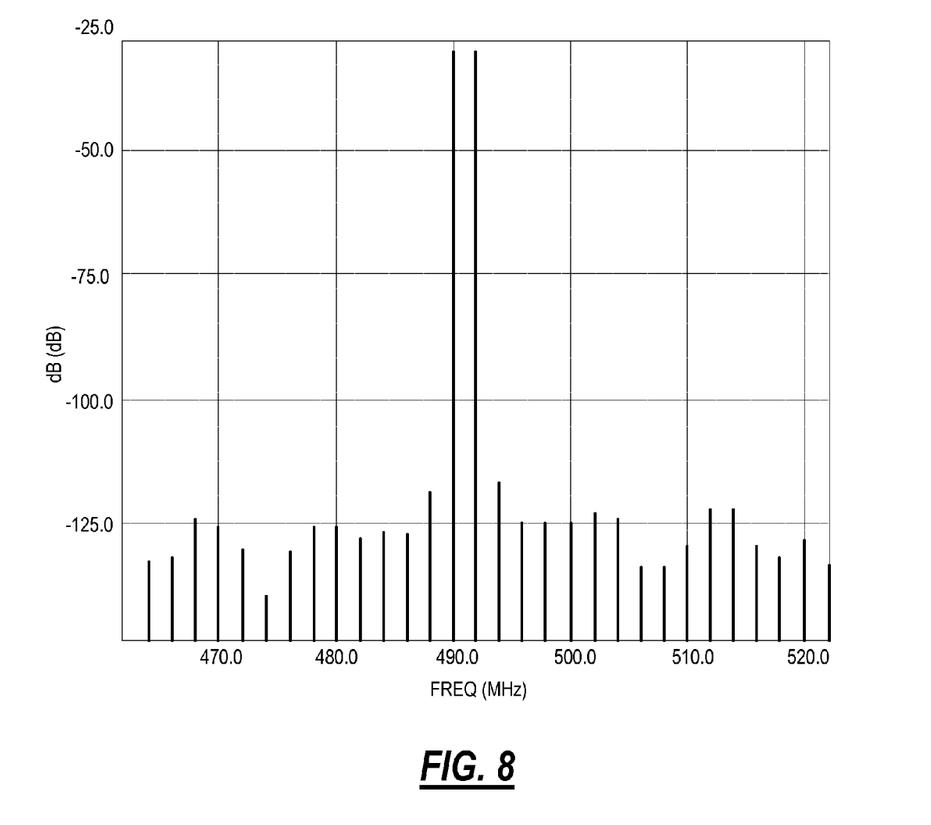
FIG. 8 is a graph of signals at an input of the mixer of FIG. 6 in accordance with some embodiments.
Figure 11:
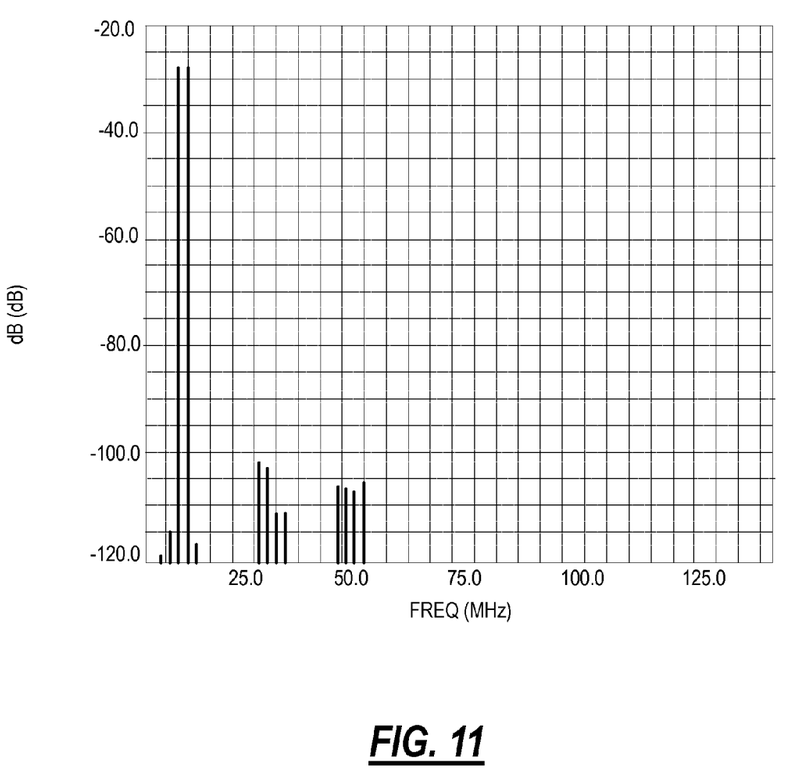
FIG. 11 is a graph of a frequency based output waveform of the mixer of FIG. 6 in a 1X sub-sampling configuration in accordance with some embodiments.

Returning to FIG. 6, an input signal source, or generator, that is, port 35, sources a signal at 490 MHz and another signal at 492 MHz. Further assume that each signal has an output power level of –27 dBV as shown in FIG. 8. The input signal source's, or generator's, source impedance is 100 Ohms. The generator is approximately power matched to the mixer input with resistor R180. Additionally, assume the mixer 80 is configured as a 3X sub-sampling mixer. FIG. 5 shows the LO output from all four LO pulse generators. FIG. 9 shows the frequency based output waveform of the mixer for 3X sub-sampling ratio. Note that the FIG. 9 IM3 components are around –105 dBV. This should result in a few dB worse than the original Tayloe mixer; see FIG. 11, where the IM terms are at –115 dBV. Likewise, FIG. 10 represents the resultant output spectrum of the mixer when 9X sub-sampling ratio is performed. It is clear that the IM performance has been slightly degraded (see FIG. 10) to about –95 dBV, and that the aliasing frequency has been reduced to $\frac{1}{9}^{th}$ the original 1X sampling rate frequency (about 111 MHz). As described herein, in the sampling mixers 16, 18, of FIG. 1, each switching event uses power, therefore removing events saves power; in this case, only $\frac{1}{9}^{th}$ of the 1X switching events are required resulting in substantial power savings.

Thus, as described herein, the mixers 50, 80 can be a Tayloe based variable sub-sampling mixer where sub-sample rate is scaled to a snap-shot-in-time NF requirement to adequately resolve the signal while optimizing current drain. It has been shown that a Tayloe mixer can be subsampled in a manner to hold a reasonably constant output amplitude, adequate NF and distortion while realizing a power savings due to the sub-sampling action. While we have shown and discussed a balanced configuration, it is obvious to one skilled in the art that the principles also hold for a single ended configuration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mixer system, comprising:
   mixer circuitry receiving an input of a Radio Frequency (RF) input signal and providing an output of a signal of the RF input sampled at a sub-sampling rate;
   baseband parametric control circuitry receiving the signal and measuring at least one parametric value of the signal and determining a mode of operation; and
   sampling period control circuitry receiving the at least one parametric value and the mode of operation and adjusting the sub-sampling rate based thereon, wherein the sampling ratio is adjusted to minimize power drain while ensuring performance of the at least one parametric value is satisfying a predetermined level;
   wherein the at least one parametric value comprises one of carrier-to-noise ratio (CNR), bit error rate (BER), and signal-to-noise ratio (SNR), and wherein the sampling period control circuitry is configured to determine a greatest amount of sub-sampling based for the sub-sampling rate based on the at least one parametric value.

2. The mixer system of claim 1, wherein the mode of operation comprises one of carrier detect, high frequency band, and battery charge status.

3. The mixer system of claim 1, wherein the sampling period control circuitry is configured to:
   initiate at a 1x sub-sampling rate; and
   perform a feedback loop comprising the steps of:
      receiving a measurement of the at least one parametric value;
      if the at least one parametric value satisfies a predetermined level and if the sub-sampling rate is not at a minimum rate, reducing the sub-sampling rate for increased sub-sampling; and
      if the at least one parametric value does not satisfy the predetermined level and if the sub-sampling rate is not at a maximum rate, increasing the sub-sampling rate for decreased sub-sampling.

4. The mixer system of claim 3, wherein the sampling period control circuitry is configured to:
   perform the feedback loop comprising the steps of:
      receiving the measurement of the at least one parametric value and determining the mode of operation;
      if the at least one parametric value satisfies the predetermined level, if the sub-sampling rate is not at the minimum rate, and based on the mode of operation, reducing the sub-sampling rate for increased sub-sampling; and
      if the at least one parametric value does not satisfy the predetermined level, if the sub-sampling rate is not at the maximum rate, and based on the mode of operation, increasing the sub-sampling rate for decreased sub-sampling.

5. The mixer system of claim 1, wherein the sampling period control circuitry is configured to:
   perform the feedback loop comprising the steps of:
      receiving a measurement of at least two parametric values to perform a soft decision based thereon;
      if the at least two parametric values satisfy predetermined levels and if the sub-sampling rate is not at a minimum rate, reducing the sub-sampling rate for increased sub-sampling; and
      if the at least two parametric values do not satisfy the predetermined levels and if the sub-sampling rate is not at a maximum rate, increasing the sub-sampling rate for decreased sub-sampling.

6. The mixer system of claim 1, wherein the mixer circuitry and the sampling period control circuitry comprise:
   an input port;
   a first pulse generator coupled to a first switch and a second switch;
   a second pulse generator coupled to a third switch and a fourth switch, wherein the first pulse generator and the second pulse generator operate at the sub-sampling rate; and
   a first capacitor and a second capacitor coupled to the first switch, the second switch, the third switch, and the fourth switch and configured to hold energy from the input port based on the first switch, the second switch, the third switch, and the fourth switch.

7. The mixer system of claim 6, wherein the first switch, the second switch, the third switch, and the fourth switch operate in an in-phase mixer, and wherein the mixer circuitry and the sampling period control circuitry further comprise a quadrature mixer comprising:
   a third pulse generator coupled to a fifth switch and a sixth switch;
   a fourth pulse generator coupled to a seventh switch and a eighth switch, wherein the third pulse generator and the fourth pulse generator operate at the sub-sampling rate;
   a third capacitor and a fourth capacitor coupled to the fifth switch, the sixth switch, the seventh switch, and the eighth switch and configured to hold energy from the input port based on the fifth switch, the sixth switch, the seventh switch, and the eighth switch.

8. The mixer system of claim 7, wherein the fifth switch, the sixth switch, the seventh switch, and the eighth switch comprise complementary metal-oxide-semiconductor switches.

9. A direct conversion receiver, comprising:
   a wired connection to a conducted, distributed Radio Frequency (RF) system;
   in-phase mixer circuitry receiving a filtered input from an RF device and providing an output of a baseband signal of the RF input sampled at a sub-sampling rate;
   quadrature mixer circuitry receiving a filtered input from the RF device and providing an output of a baseband signal of the RF input sampled at a sub-sampling rate;
   baseband parametric control circuitry receiving the baseband signal and measuring at least one parametric value of the baseband signal; and sampling period control circuitry receiving the at least one parametric value and determining a mode of operation and adjusting the sub-sampling rate based thereon, wherein the sub-sampling rate is adjusted to minimize power drain while ensuring performance of the at least one parametric value is satisfying a predetermined level;

wherein the at least one parametric value comprises one of carrier-to-noise ratio (CNR), bit error rate (BER), and signal-to-noise ratio (SNR), and wherein the sampling period control circuitry is configured to determine a greatest amount of sub-sampling based for the sub-sampling rate based on the at least one parametric value.

10. The direct conversion receiver of claim 9, wherein the sampling period control circuitry is configured to:
  initiate at a 1X sub-sampling rate; and
  perform a feedback loop comprising the steps of:
    receiving a measurement of the at least one parametric value;
    if the at least one parametric value satisfies a predetermined level and if the sub-sampling rate is not at a minimum rate, reducing the sub-sampling rate for increased sub-sampling; and
    if the at least one parametric value does not satisfy the predetermined level and if the sub-sampling rate is not at a maximum rate, increasing the sub-sampling rate for decreased sub-sampling.

11. The direct conversion receiver of claim 9, wherein the in-phase mixer circuitry and the sampling period control circuitry comprise:
  an input port;
  a first pulse generator coupled to a first switch and a second switch;
  a second pulse generator coupled to a third switch and a fourth switch, wherein the first pulse generator and the second pulse generator operate at the sub-sampling rate;
  a first capacitor and a second capacitor coupled to the first switch, the second switch, the third switch, and the fourth switch and configured to hold energy from the input port based on the first switch, the second switch, the third switch, and the fourth switch.

12. The direct conversion receiver of claim 11, wherein the first switch, the second switch, the third switch, and the fourth switch comprise complementary metal-oxide-semiconductor switches.

13. The direct conversion receiver of claim 9, wherein the quadrature mixer circuitry and the sampling period control circuitry comprise:
  a third pulse generator coupled to a fifth switch and a sixth switch;
  a fourth pulse generator coupled to a seventh switch and a eighth switch, wherein the third pulse generator and the fourth pulse generator operate at the sub-sampling rate;
  a third capacitor and a fourth capacitor coupled to the fifth switch, the sixth switch, the seventh switch, and the eighth switch and configured to hold energy from the input port based on the fifth switch, the sixth switch, the seventh switch, and the eighth switch.

14. The direct conversion receiver of claim 13, wherein the fifth switch, the sixth switch, the seventh switch, and the eighth switch comprise complementary metal-oxide-semiconductor switches.

* * * * *

UNITED STATES PATENT AND TRADEMARK OFFICE
CERTIFICATE OF CORRECTION

PATENT NO. : 8,838,055 B2  
APPLICATION NO. : 13/690710  
DATED : September 16, 2014  
INVENTOR(S) : Lawrence M. Ecklund et al.

Page 1 of 1

It is certified that error appears in the above-identified patent and that said Letters Patent is hereby corrected as shown below:

IN THE CLAIMS:

In Column 11, Line 49, in Claim 3, delete "at a lx" and insert -- at a 1X --, therefor.

Signed and Sealed this  
Seventeenth Day of May, 2016

Michelle K. Lee  
*Director of the United States Patent and Trademark Office*